(12) United States Patent
Chang (10) Patent No.: US 8,016,446 B2
(45) Date of Patent: Sep. 13, 2011

(54) OPTICAL PLATE AND BACKLIGHT MODULE USING THE SAME

(75) Inventor: Shao-Han Chang, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 160 days.

(21) Appl. No.: 12/317,992

(22) Filed: Dec. 31, 2008

(65) Prior Publication Data
US 2010/0002462 A1    Jan. 7, 2010

(30) Foreign Application Priority Data

Jul. 4, 2008   (CN) .......................... 2008 1 0302547
Jul. 8, 2008   (CN) .......................... 2008 1 0302639

(51) Int. Cl.
*G09F 13/04*       (2006.01)
(52) U.S. Cl. ................ 362/97.1; 362/97.2; 362/626
(58) Field of Classification Search .............. 362/97.1, 362/97.2, 615, 626, 620
See application file for complete search history.

(56) References Cited

U.S. PATENT DOCUMENTS

| 7,341,358 B2 * | 3/2008 | Hsieh et al. ............. 362/97.1 |
| 7,628,514 B2 * | 12/2009 | Hsu et al. ............. 362/333 |
| 2007/0014034 A1 * | 1/2007 | Lee et al. ............. 359/707 |
| 2007/0171671 A1 * | 7/2007 | Kurokawa et al. ........... 362/606 |

FOREIGN PATENT DOCUMENTS

CN    101196583 A    6/2008

* cited by examiner

*Primary Examiner* — Evan Dzierzynski
(74) *Attorney, Agent, or Firm* — Altis Law Group, Inc.

(57) ABSTRACT

An optical plate includes a first surface, an opposite second surface, a plurality of triangular pyramidal micro-depressions formed in the first surface, and a plurality of elongated arc-shaped depressions formed in the second surface. A backlight module using the present optical plate is also provided.

19 Claims, 12 Drawing Sheets

OPTICAL PLATE AND BACKLIGHT MODULE USING THE SAME

CROSS REFERENCE STATEMENT

This application is related to U.S. patent applications, which are application Ser. Nos. 11/940,328, 11/938,307, 11/938,308, and all entitled "PRISM SHEET AND BACKLIGHT MODULE USING THE SAME". In the co-pending applications, the inventors are Tung-Ming Hsu and Shao-Han Chang. The co-pending applications have the same assignee as the present application. The disclosure of the above identified applications is incorporated herein by reference.

BACKGROUND

1. Technical Field

The present disclosure relates to an optical plate for use in a backlight module.

2. Discussion of Related Art

Figure 10:
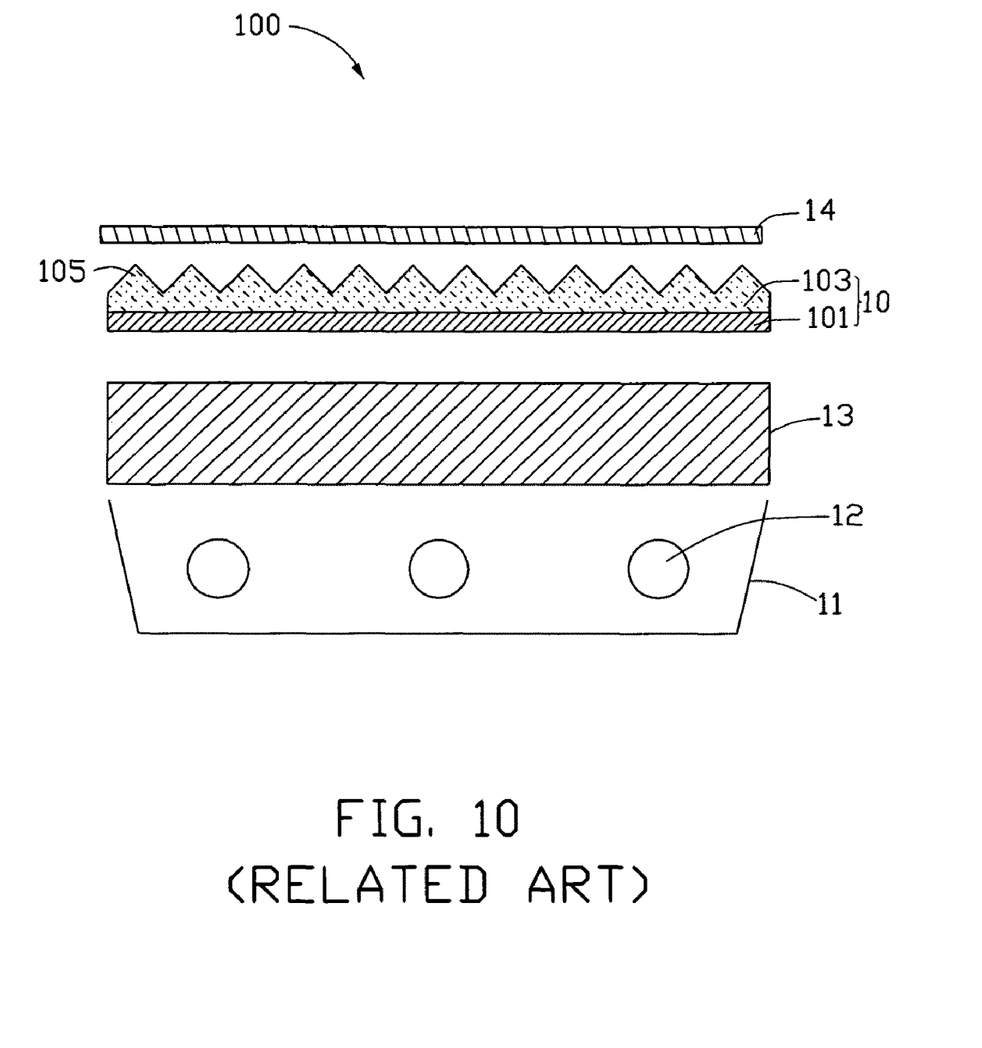
FIG. 10 is a cross-sectional view of a typical backlight module.
Figure 11:
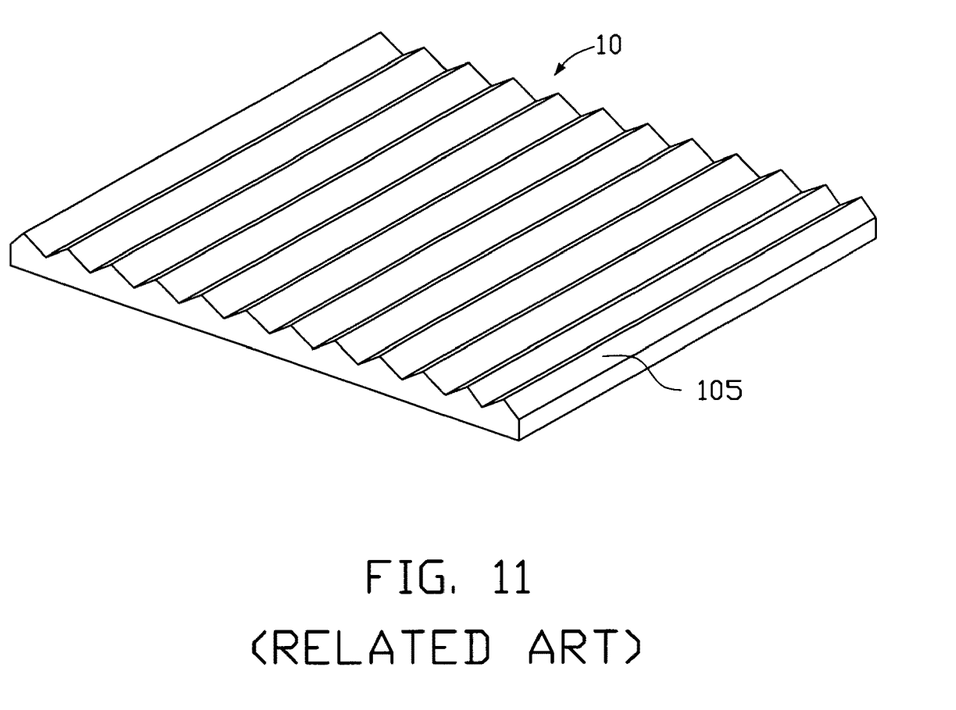
FIG. 11 is an isometric view of a typical prism sheet of the typical backlight module in FIG. 10.

Referring to FIGS. 10 and 11, a typical direct type backlight module 100 includes a frame 11, a plurality of light sources 12, a light diffusion plate 13, and a typical prism sheet 10. The light sources 12 are positioned in an inner side of the frame 11. The light diffusion plate 13 and the typical prism sheet 10 are positioned on the light sources 12 above a top of the frame 11. The light diffusion plate 13 includes a plurality of diffusing particles (not shown) for diffusing light. The prism sheet 10 includes a transparent substrate 101 and a prism layer 103 formed on a surface of the transparent substrate 101. A plurality of elongated V-shaped ridges 105 is formed on the prism layer 103.

In use, light emitted from the light sources 12 enters the diffusion plate 13 and becomes scattered. The scattered light leaves the diffusion plate 13, travels through the typical prism sheet 10, and is refracted out at the elongated V-shaped ridges 105. The refracted light leaving the typical prism sheet 10 is concentrated at the prism layer 103 and increases the brightness of the typical prism sheet 10. The refracted light propagates into a liquid crystal display panel (not shown) positioned above the typical prism sheet 10.

Although light from the light sources 12 enters the diffusion plate 13 and becomes scattered, the light leaves the typical prism sheet 10 and forms strong light spots. In order to reduce or eliminate the strong light spots, the backlight module 100 may include an upper light diffusion film 14 positioned on the typical prism sheet 10.

However, since the upper light diffusion film 14 and the typical prism sheet 10 are contacting each other, a plurality of air pockets exist around the boundaries of the light diffusion film 14 and the typical prism sheet 10. When light passes through the air pockets, some of the light undergoes total reflection along one or more boundaries. In addition, the upper light diffusion film 14 may absorb a certain amount of the light from the typical prism sheet 10. As a result, a brightness of light illumination of the backlight module 100 is reduced.

What is needed, therefore, is a new optical plate and a backlight module using an optical plate that can overcome the above-mentioned shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
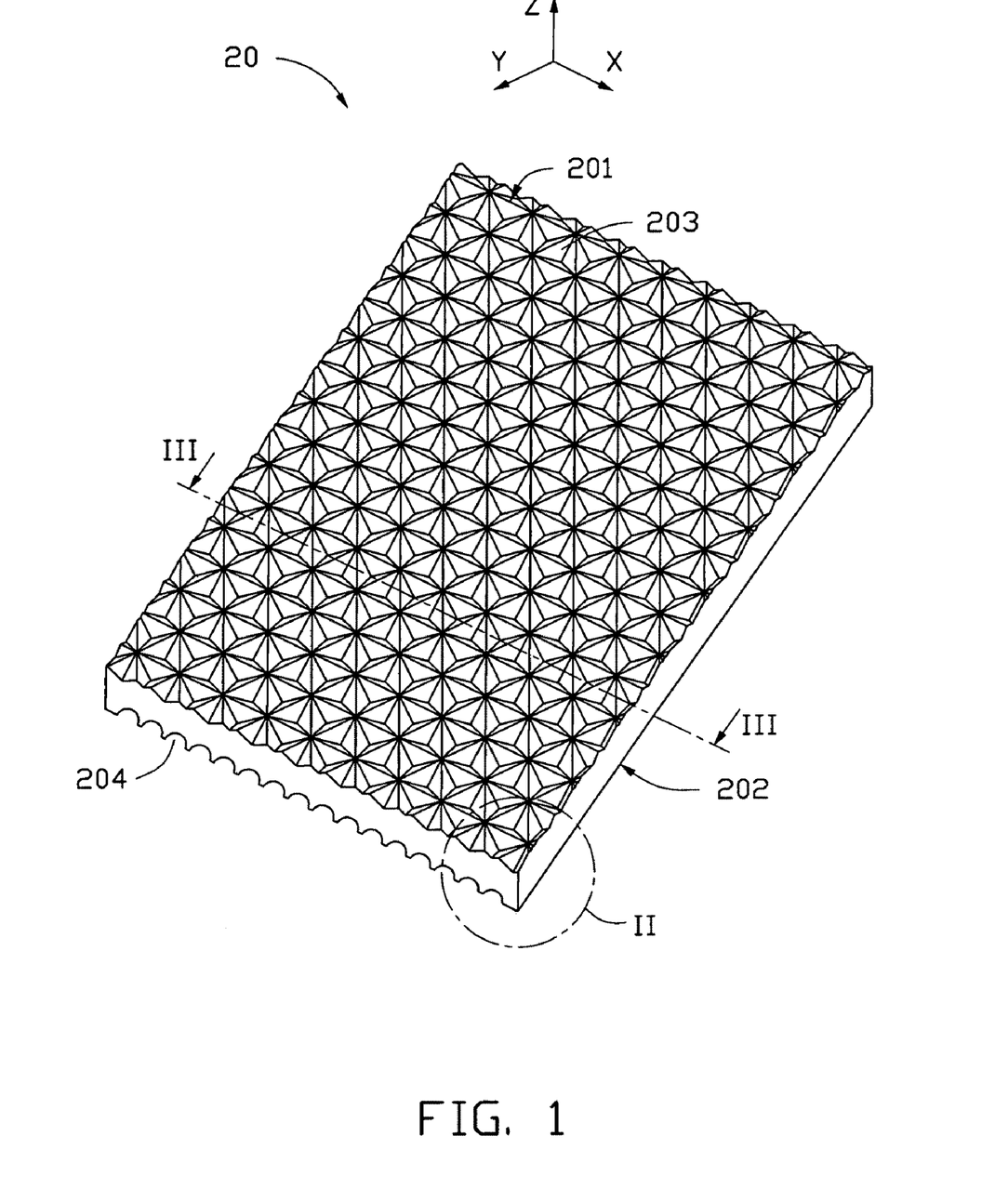
FIG. 1 is an isometric view of a first embodiment of an optical plate.

Referring to FIG. 1, a first embodiment of an optical plate 20 includes a first surface 201 and a second surface 202 opposite to the first surface 201. The first surface 201 defines a plurality of triangular pyramidal micro-depressions 203, and the second surface 202 defines a plurality of elongated arc-shaped depressions 204. The optical plate 20 is transparent and may be rectangular shaped.

Figure 2:
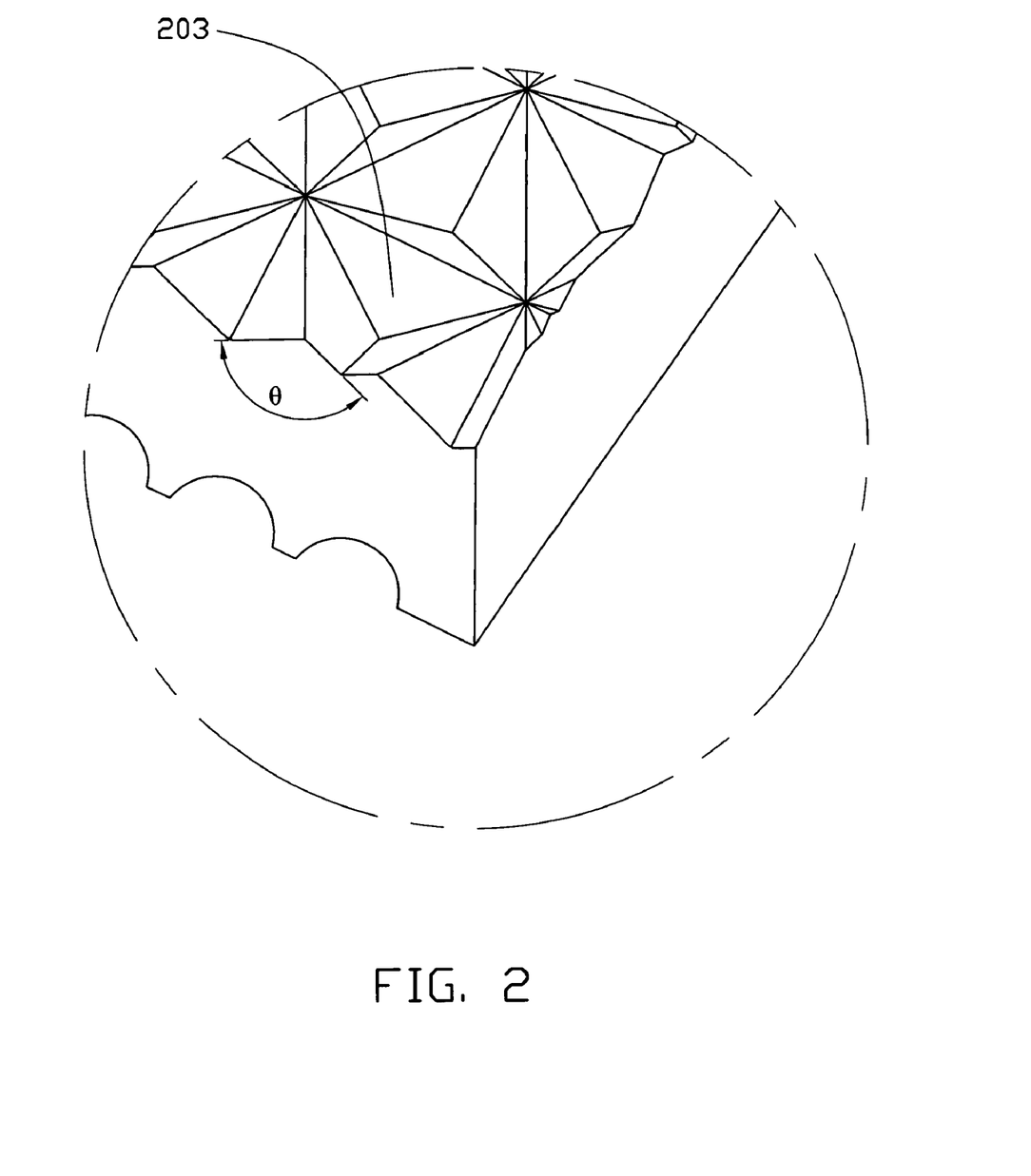
FIG. 2 is an enlarged view of a circled portion 11 in FIG. 1.
Figure 3:
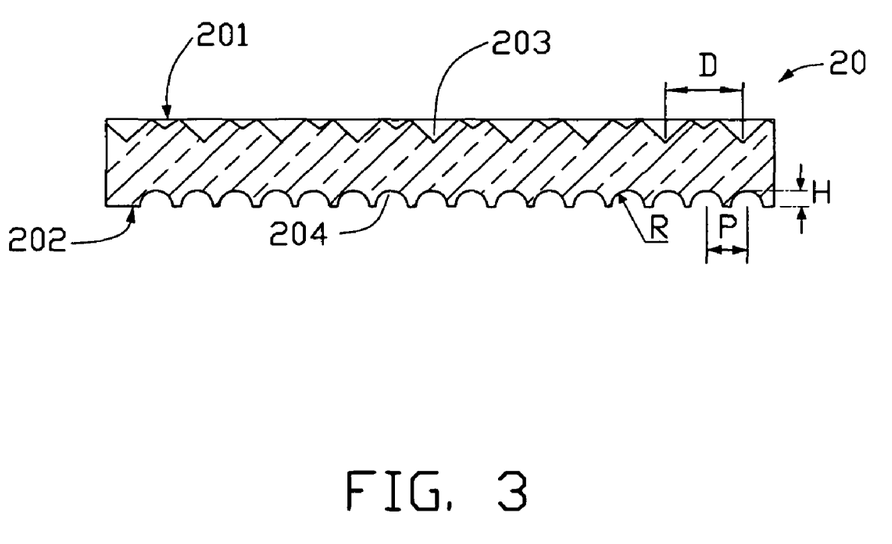
FIG. 3 is a side, cross-sectional view of the optical plate in FIG. 1, taken along line III-III.

Referring also to FIGS. 2 and 3, the triangular pyramidal micro-depressions 203 are formed in the first surface 201 side by side. Arrays of the triangular pyramidal micro-depressions extend along three different directions X, Y, and Z. All adjacent triangular pyramidal micro-depressions 203 have joining bottom edges. Each triangular pyramidal micro-depression 203 is surrounded by three adjacent triangular pyramidal micro-depressions 203. The triangular pyramidal micro-depressions 203 converge light emitted out from the first surface 201. A pitch D between adjacent triangular pyramidal micro-depressions 203 along one of the directions X, Y, and Z is about 0.025 millimeters (mm) to about 1 mm. A vertex angle θ of ridges defined by adjacent triangular pyramidal micro-depressions 203 is about 50 degrees to about 120 degrees.

The elongated arc-shaped depressions 204 are formed in the second surface 202 side by side. An extending direction of the elongated arc-shaped depressions 204 may intersect substantially perpendicularly with an extending direction of the triangular pyramidal micro-depressions 203. In the illustrated embodiment, the extending directions of the elongated arc-shaped depressions 204 intersect the direction X substantially perpendicularly.

In the illustrated embodiment, the cross-section of each elongated arc-shaped depression 204 taken along a plane perpendicular to the extending direction of the elongated arc-shaped depressions 204 is substantially semicircular. The radius R defined by each elongated arc-shaped depression 204 is about 0.01 mm to about 3 mm. The pitch P between adjacent elongated arc-shaped depressions 204 is about 0.025 mm to about 1.5 mm. The depth H of each elongated arc-shaped depression 204 is about 0.01 mm to about 3 mm.

A thickness of the optical plate 20 is about 0.4 mm to about 4 mm. The optical plate 20 may be integrally formed by injection molding technology. The optical plate 20 may be made from a material such as polycarbonate, polymethyl methacrylate, polystyrene, copolymer of methylmethacrylate and styrene, and any suitable combination thereof.

Figure 4:
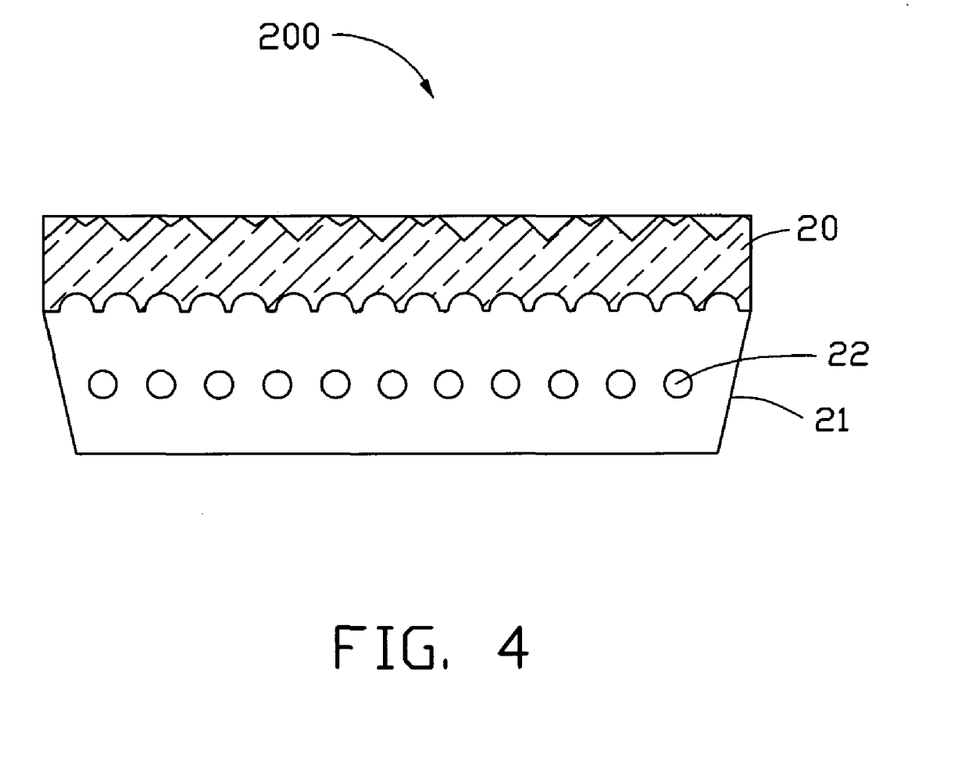
FIG. 4 is a side, cross-sectional view of a backlight module including the optical plate in FIG. 1.

Referring to FIG. 4, the optical plate 20 is shown employed in a backlight module 200. The backlight module 200 includes a frame 21, a plurality of light sources 22 positioned in the frame 21, and the optical plate 20 positioned on the frame 21 such that the second surface 202 faces the light sources 22 and the first surface 201 faces away from the light sources 22. Light enters the optical plate 20 via the second surface 202. Incident light that may have been internally reflected on a flat surface, are refracted, reflected, and diffracted because inner surfaces of the triangular pyramidal micro-depressions 203 and inner surfaces of the elongated arc-shaped depressions 204 are slanted. As a result, light outputted from the first surface 201 is more uniform than light outputted from a light output surface of a typical prism sheet 10 shown in FIG. 11, and strong light spots seldom occur. In addition, an extra upper light diffusion film between the optical plate 20 and the liquid crystal display panel is unnecessary. Thus, the efficiency of light utilization is enhanced.

In addition, the optical plate 20 has a better rigidity and mechanical strength than the typical prism sheet 10 because the optical plate 20 is integrally formed by injection molding technology. Thus, the optical plate 20 has a relatively high reliability. Furthermore, the extending directions of the elongated arc-shaped depressions 204 intersect with the extending direction of the triangular pyramidal micro-depressions 203 substantially perpendicularly, thus decreasing occurrences of interference lines on the first surface 201.

Figure 5:
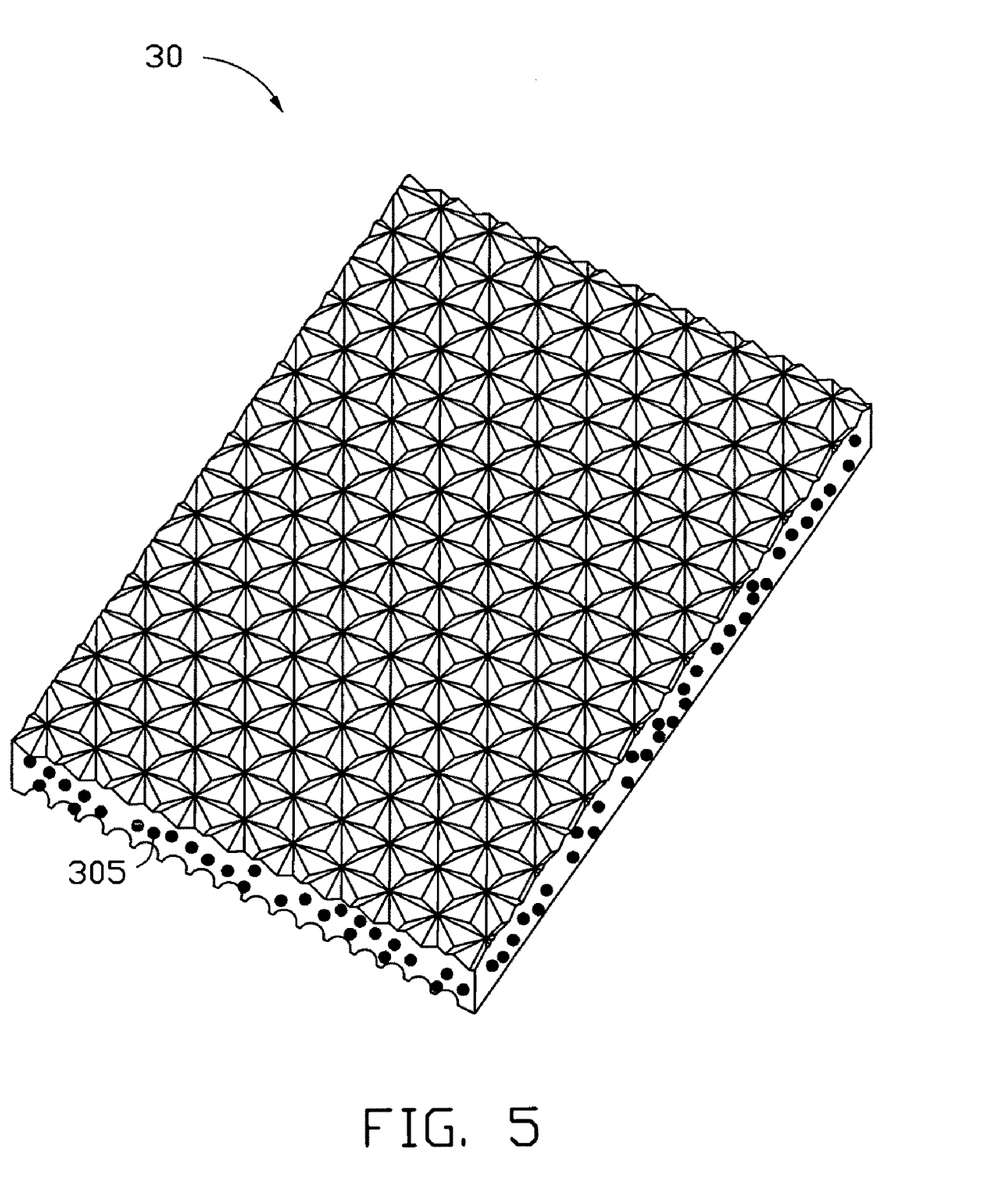
FIG. 5 is an isometric view of a second embodiment of an optical plate.

Referring to FIG. 5, a second embodiment of an optical plate 30 is similar to the first embodiment of the optical plate 20, except that the optical plate 30 further includes a plurality of diffusion particles 305 distributed in the optical plate 30. The diffusion particles 305 may consist of silicon dioxide particles, titanium dioxide particles, acrylate copolymer particles, and any combination of those.

Referring to Table 1 below, the following test samples are provided.

TABLE 1

| Test samples | Condition |
| --- | --- |
| 1 | LED + typical prism sheet 10 (shown in FIG. 11) |
| 2 | LED + optical plate 20 (shown in FIG. 1) |
| 3 | LED + optical plate 30 (shown in FIG. 5) |

Figure 6:
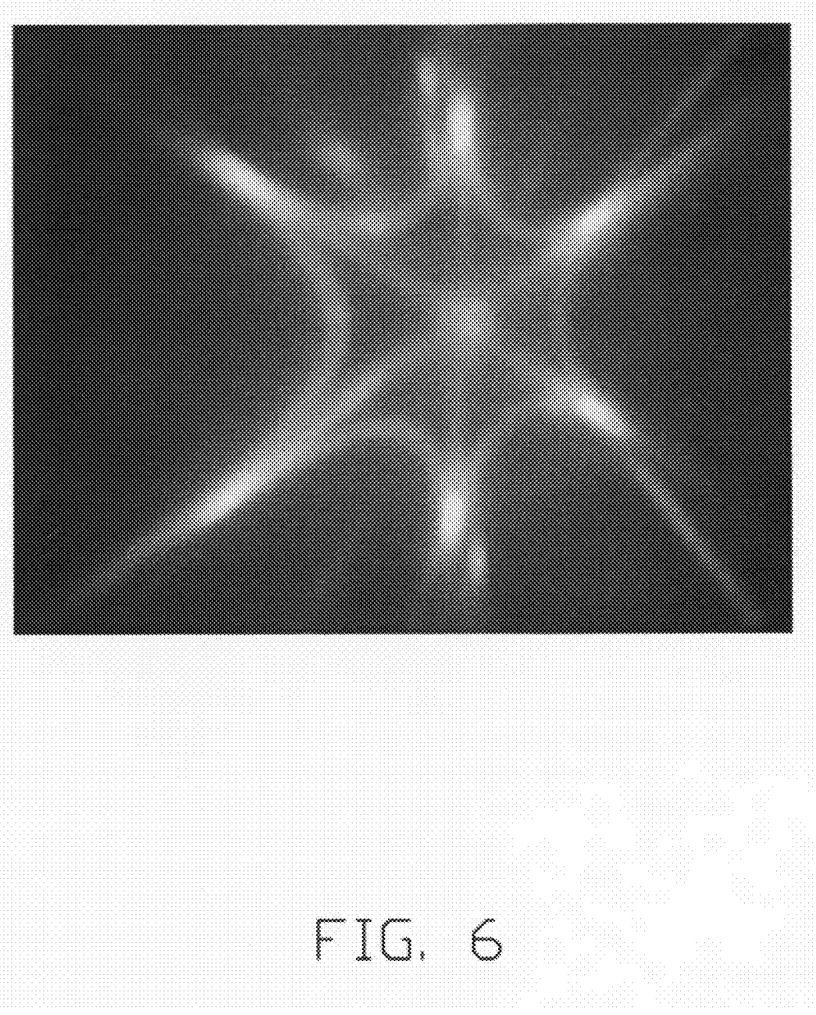
FIG. 6 is a photo showing an illumination distribution testing of the optical plate in FIG. 1.
Figure 7:
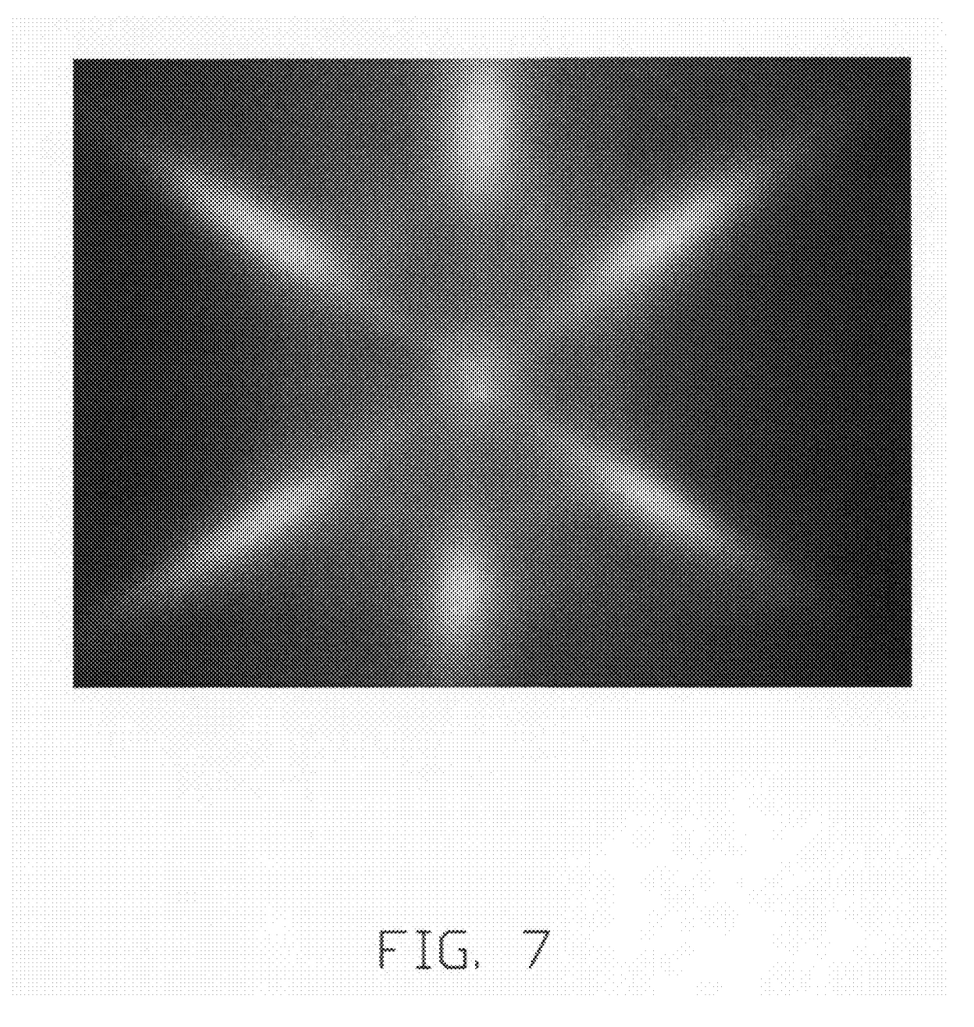
FIG. 7 is a photo showing an illumination distribution testing of the optical plate in FIG. 5.
Figure 12:
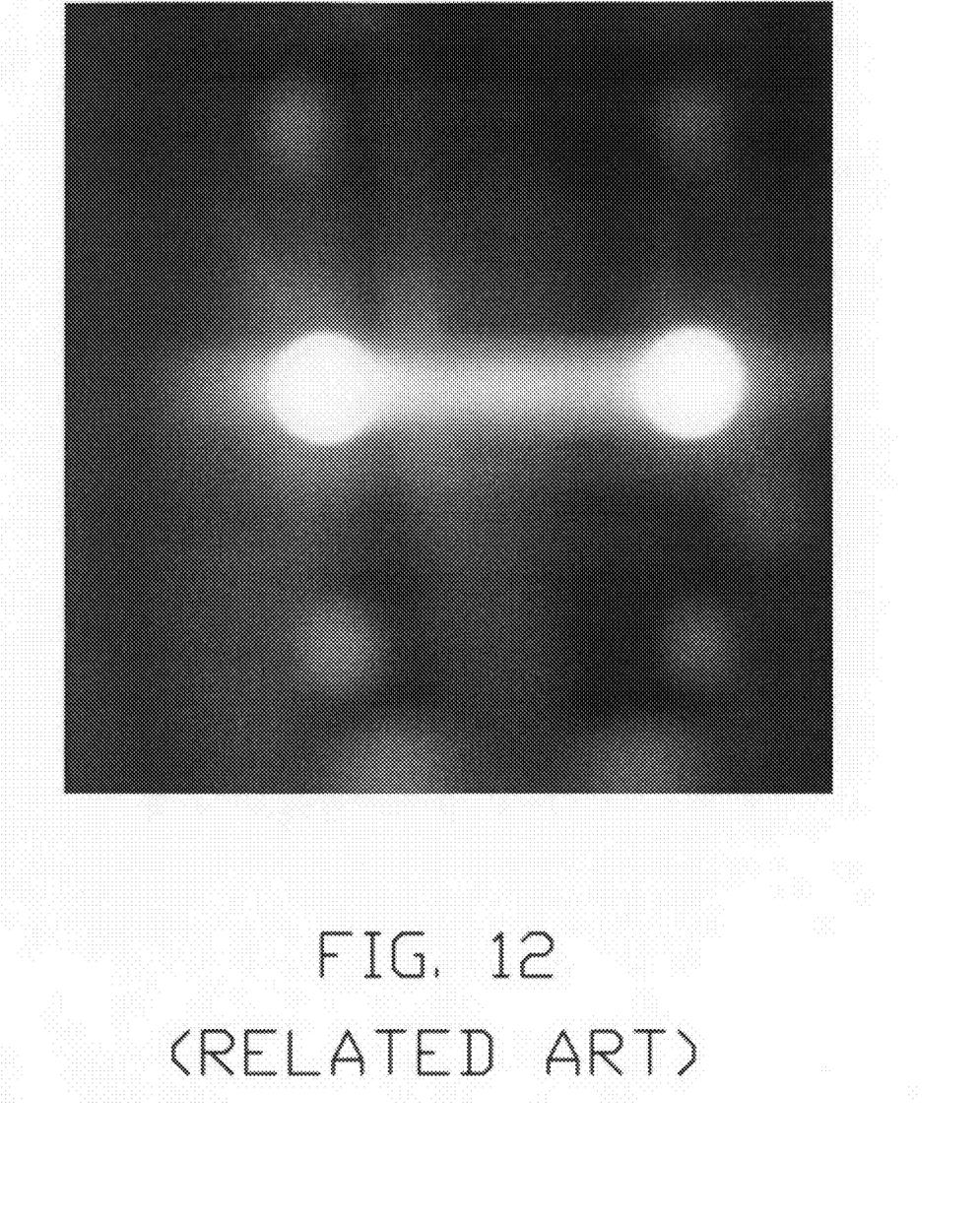
FIG. 12 is a photo showing an illumination distribution testing of the typical prism sheet in FIG. 11.

Referring to FIGS. 6, 7, and 12, test results from the test conditions described in Table 1 shows light spots formed on the typical prism sheet 10 is relatively strong. In contrast, light spots formed on the optical plate 20 and optical plate 30 are relatively weak. The test results show light emitting from the optical plate 20 is uniform, and light emitting from the optical plate 30 is more uniform. Therefore, when the optical plate 20 or optical plate 30 is employed in a backlight module, strong light spots of the light sources seldom occur, more uniform light is achieved, and an upper light diffusion film positioned above the optical plate 20 or optical plate 30 is unnecessary. Thus, the efficiency of light utilization is enhanced.

Figure 8:
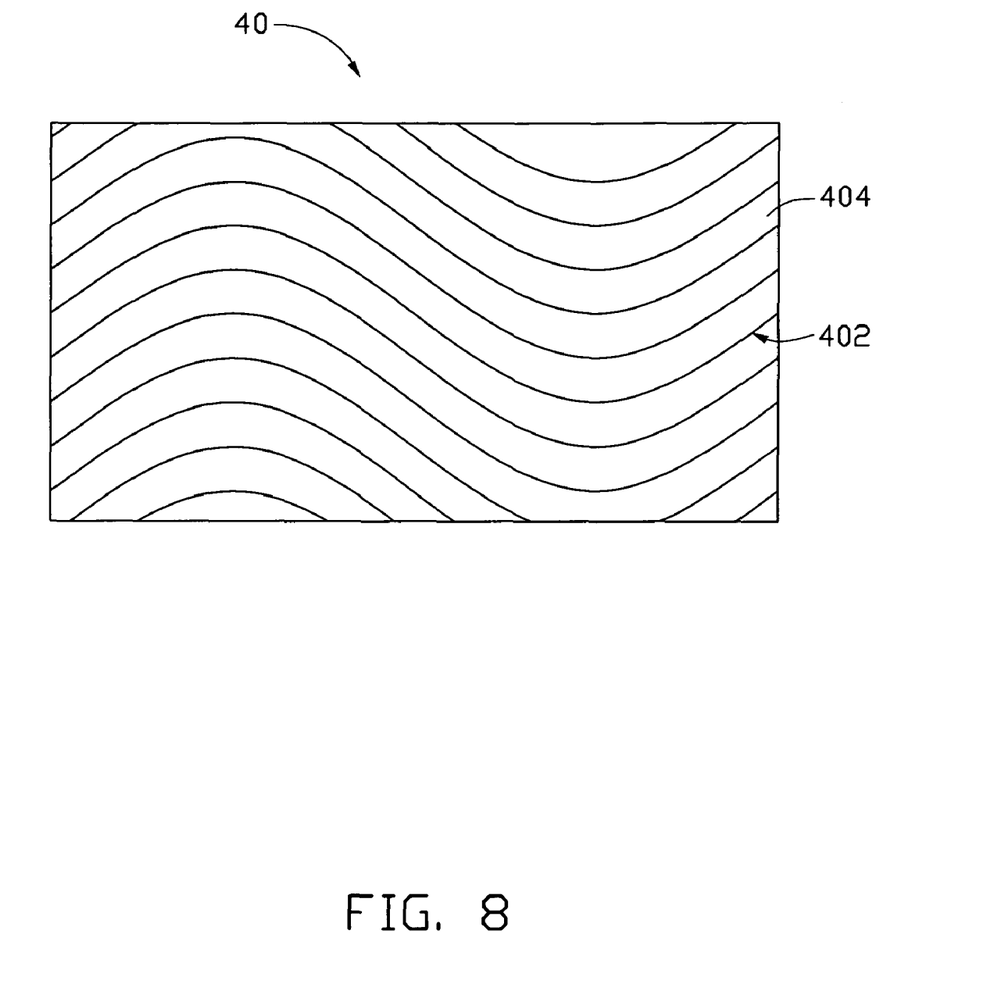
FIG. 8 is a bottom view of a third embodiment of an optical plate.

Referring to FIG. 8, a third embodiment of an optical plate 40 is similar to the first embodiment of the optical plate 20, except that the optical plate 40 includes a plurality of elongated arc-shaped depressions 404 extending along curves on a second surface 402. In the illustrated embodiment, each of the elongated arc-shaped depressions 404 extends along a predetermined S-shaped curve. Because the arrangement of the curved, elongated arc-shaped depressions 404 are aligned obliquely with LCD pixels, moirée interference between the optical plate 40 and the pixel pitch of a LCD panel can be decreased or even eliminated.

Figure 9:
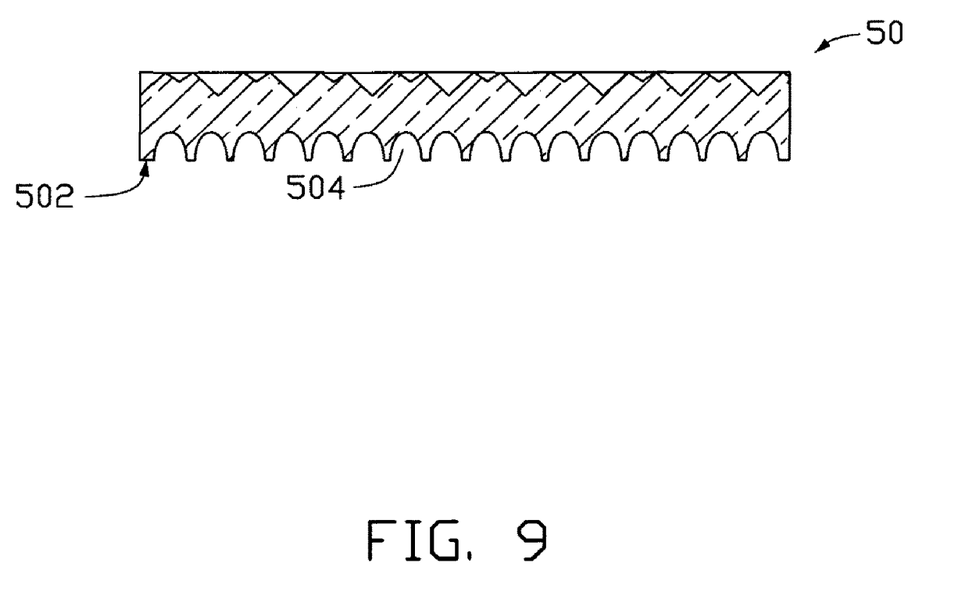
FIG. 9 is a side, cross-sectional view of a fourth embodiment of an optical plate.

Referring to FIG. 9, a fourth embodiment of an optical plate 50 is similar to the optical plate 20, except that the optical plate 50 includes a plurality of elongated arc-shaped depressions 504 formed in a second surface 502. The cross-section of each elongated arc-shaped depression 504 taken along a plane perpendicular to the extending direction of the elongated arc-shaped depressions 504 is substantially partially elliptical. In other embodiments, the cross-section of each elongated arc-shaped depression 504 may have other shapes, such as a parabolic curve, a sine curve, and so on.

Finally, while various embodiments have been described and illustrated, the invention is not to be construed as being limited thereto. Various modifications can be made to the embodiments by those skilled in the art without departing from the true spirit and scope of the present disclosure as defined by the appended claims.

What is claimed is:

1. An optical plate used in back light module of LCD, comprising:
   a first surface;
   a second surface opposite to the first surface;
   a plurality of triangular pyramidal micro-depressions formed in the first surface, and
   a plurality of elongated arc-shaped depressions formed in the second surface, wherein the optical plate is transparent, the elongated arc-shaped depressions extend along S-shaped curves which are coplanar with the second surface.

2. The optical plate according to claim 1, wherein the triangular pyramidal micro-depressions are formed in the first surface side by side, and each of the triangular pyramidal micro-depressions is surrounded by three adjacent triangular pyramidal micro-depressions.

3. The optical plate according to claim 2, wherein a pitch between adjacent triangular pyramidal micro-depressions along one direction is about 0.025 millimeters (mm) to about 1 mm.

4. The optical plate according to claim 2 wherein a vertex angle of ridges defined by adjacent triangular pyramidal micro-depressions is about 50 degrees to about 120 degrees.

5. The optical plate according to claim 1, wherein a thickness of the optical plate is about 0.4 mm to about 4 mm.

6. The optical plate according to claim 1, wherein the plurality of elongated arc-shaped depressions are formed in the second surface side by side.

7. The optical plate according to claim 6, wherein a pitch between adjacent elongated arc-shaped depressions is about 0.025 mm to about 1.5 mm.

8. The optical plate according to claim 1, wherein an extending direction of the elongated arc-shaped depressions intersects substantially perpendicularly with an extending direction of the triangular pyramidal micro-depressions.

9. The optical plate according to claim 1, wherein a cross-section of each elongated arc-shaped depression taken along a plane perpendicular to the extending direction of the elongated arc-shaped depressions is substantially semicircular.

10. The optical plate according to claim 1, wherein a radius defined by each elongated arc-shaped depression is about 0.01 mm to about 3 mm.

11. The optical plate according to claim 1, wherein a depth of each elongated arc-shaped depression is about 0.01 mm to about 3 mm.

12. The optical plate according to claim 1, wherein the optical plate is made of a transparent material selected from the group consisting of polycarbonate, polymethyl methacrylate, polystyrene, copolymer of methylmethacrylate and styrene, and any combination thereof.

13. The optical plate according to claim 1, wherein a cross-section of each elongated arc-shaped depression taken along a plane perpendicular to the extending direction of the elongated arc-shaped depressions is substantially partially elliptical.

14. A backlight module comprising:
a frame;
a plurality of light sources positioned in the frame; and
an optical plate disposed above the light sources, the optical plate comprises:
a first surface;
a second surface opposite to the first surface;
a plurality of triangular pyramidal micro-depressions formed in the first surface; and
a plurality of elongated arc-shaped depressions formed in the second surface, wherein the optical plate is transparent, the elongated arc-shaped depressions extend along S-shaped curves which are coplanar with the second surface.

15. The backlight module according to claim 14, wherein the triangular pyramidal micro-depressions are formed in the first surface side by side, and each of the triangular pyramidal micro-depressions is surrounded by three adjacent triangular pyramidal micro-depressions.

16. The backlight module according to claim 14, wherein the plurality of elongated arc-shaped depressions are formed in the second surface side by side, and an extending direction of the elongated arc-shaped depressions intersects substantially perpendicularly with an extending direction of the triangular pyramidal micro-depressions.

17. An optical plate used in back light module of LCD, comprising:
a first surface;
a second surface opposite to the first surface;
a plurality of diffusion particles distributed in the optical plate;
a plurality of triangular pyramidal micro-depressions formed in the first surface; and
a plurality of elongated arc-shaped depressions formed in the second surface, wherein the optical plate is transparent, the elongated arc-shaped depressions extend along S-shaped curves which are coplanar with the second surface.

18. The optical plate according to claim 17, wherein the diffusion particles are selected from the group consisting of silicon dioxide particles, titanium dioxide particles, acrylate copolymer particles, and any combination of those.

19. The optical plate according to claim 17, wherein the triangular pyramidal micro-depressions are formed in the first surface side by side, and each of the triangular pyramidal micro-depressions is surrounded by three adjacent triangular pyramidal micro-depressions.

* * * * *